Jan. 7, 1936. E. W. TESSMER 2,027,128
DIRIGIBLE TOBOGGAN
Filed July 18, 1935
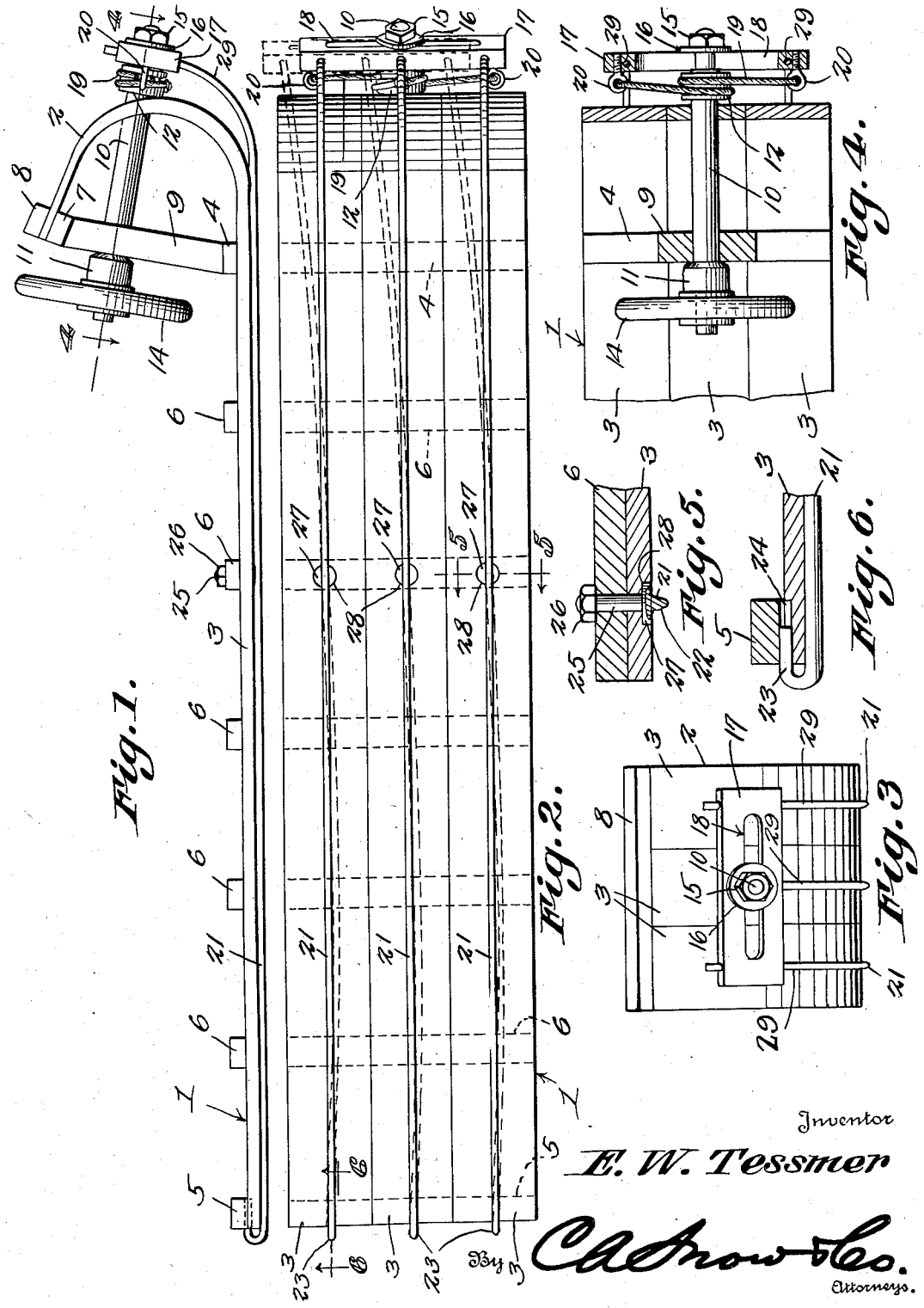
Inventor
*E. W. Tessmer*
By *C. A. Snow & Co.*
Attorneys.

Patented Jan. 7, 1936

2,027,128

UNITED STATES PATENT OFFICE 2,027,128

DIRIGIBLE TOBOGGAN

Edwin William Tessmer, Tomahawk, Wis.

Application July 18, 1935, Serial No. 32,122

3 Claims. (Cl. 280—22)

This invention aims to provide novel means for steering a toboggan. The invention aims to provide a toboggan having flexible runners of novel form, novel means under the control of an operator being provided, for flexing the runners, to bring about a steering of the toboggan. The invention aims to provide novel means for mounting the runners on the toboggan, and, especially, to provide novel means for mounting the runners pivotally, intermediate their ends, so that the runners can flex in one direction, in front of the pivotal connections, and in an opposite direction to the rear of the pivotal connections. The invention aims to furnish novel means whereby lateral movement may be imparted to the runners from a steering shaft.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawing:

Fig. 1 shows in side elevation, a device constructed in accordance with the invention;

Fig. 2 is a bottom plan;

Fig. 3 is a front elevation;

Fig. 4 is a section on the line 4—4 of Fig. 1;

Fig. 5 is a section on the line 5—5 of Fig. 1;

Fig. 6 is a section on the line 6—6 of Fig. 1.

The toboggan, as usual, preferably is made of wood, although some other material of construction might be employed. The toboggan comprises a flat body 1 of any desired length, having an upwardly and rearwardly curved prow 2 at its forward end. The body 1 and the prow 2 are made up of longitudinal slats 3. The parts of the slats 3 that compose the body 1 are connected by a front cleat 4, a rear cleat 5, and any desired number of intermediate cleats 6, all located on the upper surface of the body 1. The parts of the slats 3 that make up the prow 2 are connected at the upper or rear end of the prow 2 by a lower cleat 7 and an upper cleat 8. A support for the prow 2 is provided, and is in the form of a post 9, secured at its lower end to the front cleat 4, and at its upper end to the lower cleat 7.

A downwardly and forwardly inclined steering shaft 10 is journaled in the post 9 and in the prow 2. Near to its rear end, the shaft 10 is supplied with an enlargement 11 located close behind the post 9. A drum 12 is fixed to the shaft 10 and is located in front of the prow 2, in close relation to the prow. The enlargement 11, cooperating with the post 9, and the drum 12, cooperating with the prow 2, prevent the shaft 10 from moving endwise to any appreciable or undesirable extent. A hand wheel 14, or its equivalent, is secured to the rear end of the steering shaft 10.

A nut 15 is mounted on the forward end of the steering shaft 10. A washer 16 is mounted on the steering shaft 10 behind the nut 15. The nut 15 and the washer 16 constitute an abutment on the forward end of the shaft 10. A cross head 17 slides transversely of the toboggan, on the shaft 10, ahead of the prow 2 and between the washer 16 and the drum 12, the cross head 17 having an elongated slot or guide 18 receiving the forward portion of the shaft 10. A flexible element 19 is wound about the drum 12 and is secured in its intermediate portion thereto, the ends of the flexible element 19 extending outwardly in opposite directions with respect to the drum. The ends of the flexible element 19 are attached by securing elements 20 to the ends of the cross head 17.

Flexible metal runners 21 are provided. The runners 21 are moderately wedge-shaped in cross section, as shown at 22 in Fig. 5, so that they may acquire a hold on ice or closely packed or crusted snow. At their rear ends, the runners 21 have upwardly and forwardly extended hooks 23. The ends of the hooks 23 are received in recesses 24 (Fig. 6) formed partly in the rear cleat 5 and partly in the upper surfaces of the slats 3, the runners 21 being disposed approximately midway between the longitudinal edges of the slats 3.

Intermediate its ends, the body 1 of the toboggan carries rotatable fulcra wherewith the intermediate portions of the runners 21 are connected. Specifically, these fulcra 25 are shafts journaled in the slats 3 and in one of the intermediate cleats 6, as shown in Fig. 5. Nuts 26 are mounted on the upper ends of the shafts 25 and cooperate with the slat 6. On their lower ends, the shafts 25 have enlarged heads 27. The heads 27 are journaled in recesses 28 formed in the lower surfaces of the slats 3. The shafts 25 are located approximately midway between the ends of the body 1. The flexible runners 21 are secured intermediate their ends to the heads 27 of the shafts 25. The runners 21 have upturned forward ends 29, located slightly in advance of the prow 2 and spaced therefrom. The upper or forward portions of the parts 29 are mounted in the cross head 17.

In practical operation, the steering shaft 10 is rotated by means of the hand wheel 14. The drum 12 actuates the flexible element 19, the cross head 17 is moved endwise and transversely of the toboggan, on the forward portion of the shaft 10, and the cross head 17 flexes the runners 21 horizontally, the runners being in slidable contact with the lower surface of the body 1. Thus a steering of the toboggan, at the command of an operator, is brought about. Attention is directed to the fact that when the runners 21 flex, the shafts or fulcra 25 can rotate a little. This enables the forward portions of the runners 21 to flex laterally in one direction, and the rear portions of the runners to flex laterally in an opposite direction, as shown in dotted line in Fig. 1, the runners, therefore, being peculiarly efficient in guiding the toboggan on any course which the operator may select. The toboggan can be guided around stumps, rocks, or other obstacles, accurately and safely, and it is not necessary for the operator to resort to steering by means of dragging his toe, or otherwise. The device is so constructed that the operator can steer a predetermined course over ice, packed or crusted snow, and, nevertheless, the toboggan will work in a satisfactory way on soft snow. The runners 21 give speed to the toboggan, especially over a hard surface.

Having thus described the invention, what is claimed is:

1. A toboggan comprising an approximately flat, elongated body having an upturned prow, flexible runners mounted on the lower surface of the body, mechanism under the control of the rider and connected to the forward portions of the runners for flexing the runners laterally, to bring about a steering of the toboggan, means for attaching the rear portions of the runners to the body, and means for pivotally connecting the intermediate portions of the runners to the body whereby the runners will flex laterally in one direction, ahead of the last-specified means, and laterally in an opposite direction, to the rear of the last-specified means.

2. A toboggan constructed as set forth in claim 1, and further characterized by the fact that the last-specified means embodies shafts whereunto the intermediate portions of the runners are secured, the shafts being journaled in the body.

3. A toboggan constructed as set forth in claim 1, in combination with a support extended between the prow and the body, a shaft journaled in the prow and in the support, means on the shaft whereby a rider may rotate it, a cross head slidable on the shaft, in advance of the prow, the forward portions of the runners being connected to the cross head, a flexible element wound about the shaft and having its ends extended in opposite directions with respect to the shaft, and means for connecting the ends of the flexible element to the cross head, on opposite sides of the shaft.

EDWIN WILLIAM TESSMER.